Fig.1

July 3, 1962 S. H. NORTON 3,042,100
APPARATUS FOR MAKING VALVE SPRING RETAINER LOCKS
Filed April 18, 1958 8 Sheets-Sheet 4

INVENTOR.
SAMUEL H. NORTON
ATTORNEYS

July 3, 1962 S. H. NORTON 3,042,100
APPARATUS FOR MAKING VALVE SPRING RETAINER LOCKS
Filed April 18, 1958 8 Sheets-Sheet 5

INVENTOR.
SAMUEL H. NORTON

United States Patent Office 3,042,100
Patented July 3, 1962

3,042,100
APPARATUS FOR MAKING VALVE SPRING RETAINER LOCKS
Samuel H. Norton, University Heights, Ohio, assignor to Thompson Ramo Wooldridge Inc., a corporation of Ohio
Filed Apr. 18, 1958, Ser. No. 729,337
13 Claims. (Cl. 153—64)

The present invention relates to improvements in the art of making valve spring retainer locks, and more particularly to an improved machine and method for making locks of the type positioned against a valve stem to form a collar for axially locking a valve spring retainer plate on the valve stem.

Locks of the type to which the invention relates and which the improved machine and method of the invention are utilized to manufacture are usually formed of metal and have a generally semi-cylindrical form with two opposed locks being used to form a collar on a valve stem. The valve locks have an inner substantially cylindrical surface to fit against the outer surface of a valve stem and have an annular bead on the inner surface to enter a groove on the stem for holding the locks against axial movement along the stem. The outer surface of the locks have a shape to lie in a conical plane and to fit against an inner conical surface on a valve spring retainer plate. The locks, in operation, hold a spring retainer plate to a valve stem so that the force of a valve operating spring can act on the plate to hold the valve in closed position.

A feature of the present invention is to provide an improved machine and method for manufacturing valve locks which have an improved structure over locks made by methods and machines heretofore used, and which do not have defects inherent with locks made by previous machines and methods.

Another feature of the invention is the provision of a machine and method which may be employed to make valve retainer locks that are more economical due to savings in material and time.

In certain commercial processes heretofore used for manufacturing locks, a flat strip of lock material was provided and retainer locks formed from the material by pressing a segment of the strip over a shaped die having a concave surface by a punch or die having a convex surface. The die with the convex surface heretofore had two protruding punch surfaces which engaged the metal and forced it over the curved convex die. An example of the process is shown in Patent 2,053,206, Kelleher. In this manner of forming the lock, the material between the two dies was bent at its weakest point midway between the projections of the concave die, and this bend formed a very sharp kink, which remained in the finished piece to provide a depression in the inner cylindrical surface of the finished lock.

In processes heretofore used, the cone-shaped locks were made out of a flat or straight sided material. The concave die was provided with a conical cavity and as the material was forced against the convex die the outer ends of the lock and the outer ends of the bead within the lock necessarily turned or flared upwardly toward the thicker end of the lock in order to produce the resultant cone with the displacement of the metal material. This distorted the upper surface of the bead, so that the bead did not engage the edge of the valve stem groove in surface engagement, but only in point contact at the ends of the bead. Therefore, complete locking did not occur until the bead was worn enough to give the groove in the valve stem a flat bearing against the bead. During the wearing time, the lock moved up on the valve stem and changed the operating length of the valve spring.

In methods heretofore used, as the edges of the concave die pushed the lock downwardly and the metal bent with a sharp kink in the center, the outer edges of the concave die dug into the surface of the metal and scraped out a portion of both sides of the lock. This scraped out portion remained in the surface of the finished lock and bearing surface was lost in the outer edges and also tended to split and ruin some of the locks. Further, the gouged out space permitted the passage of oil past the locks at this point, which was undesirable.

In certain methods heretofore used, such as those above described, when the lock was pressed between the dies, cut-off knives moved inwardly to remove the excess of material and complete the lock. This created a burr on the inner surface of the lock which was increased in size as the cutting dies became worn. These burrs finished as a rounded hump along the edge of the lock preventing proper seating on the valve stem.

The cut-off knives moved inwardly in a plane positioned inward from the radial center of the lock in order to move in opposing directions, and form a lock which had an arcuate surface slightly less than a complete semi-circle. When two locks were assembled on a valve stem to form a collar, the cut ends formed a groove with parallel sides so that when either lock was rotated to close the grooves, the ends met in line engagement rather than in surface engagement. The line engagement was at the outer surface of the locks, and thus the locks are deprived of some of the inner bearing surface of the valve stem.

Methods of the type above described were heretofore necessary in that it is impossible to bend the very end of a length of material to a smooth arcuate surface. To compensate for this difficulty, locks were bent with more material than used in the finished lock, forming the material into a U shape, and then cutting off both legs of the U. This operation resulted in many of the above difficulties, and wasted a substantial amount of the piece of lock material.

It is therefore, an important object of the present invention to provide an improved machine and method for forming valve spring retainer locks which avoid the above disadvantages in the methods of making and in the lock structure, and which will obtain a valve lock structure which does not have the defects inherent with previous methods of manufacture.

Another object of the invention is to provide a machine and method for forming valve locks wherein the leading end of a supply strip of material is bent to the curvature of the lock for each successive lock, and wherein there is no waste material formed by cutting off scrap ends from the locks.

Another object of the invention is to provide an improved machine and method of manufacture for making valve locks of an improved quality wherein the locks do not have burrs at the ends of the inner surfaces, do not have gouges at the ends of the outer surfaces, are free of kinks which form depressions in the inner surface, and have an inner annular bead with a surface lying completely in a plane extending at right angles to the axis of the lock. Also, another object of the machine is to be able to make a lock that can be used in multiples other than two, such as three pieces or four pieces if desired. Three piece locks may have an advantage if installed as a unit. (As in one of my previous disclosures.) Three piece locks cannot be made by previous methods because of the way the material ends are cut off.

Another object of the invention is to provide a machine and method which will manufacture a valve lock having end surfaces which lie in a plane passing through the radial center of the lock.

Another object of the invention is to provide an improved machine and method which will produce valve locks having substantially perfect cylindrical interior surfaces and conical outer surfaces with the respective surfaces lying completely in cylindrical and conical planes.

Another object of the invention is to provide an improved machine and method for making a valve lock structure which will have a maximum internal surface available for engagement with a valve stem when in operative location.

Another object of the invention is to provide an improved machine and method for edge-bending a strip of tapered substantially flat material for forming valve locks.

Another object of the invention is to provide an improved valve lock making machine which will curl the leading end of a strip of lock material and sever a lock from the curled end.

A further object of the invention is to provide an improved method and machine for making successive valve locks from a strip of supply material which will cut a first end from a strip after it has been curled and discard the first end leaving a bent end on the strip.

A further object of the invention is to provide an improved machine for making valve locks which will form and cut a valve lock to a slight undersize and thereafter press the lock to the desired dimensions.

A further object of the invention is to provide an automatic machine for making valve locks with an improved ejector mechanism for removing the completed locks.

A still further object of the invention is to provide an automatic valve locking machine with an improved feeding mechanism for a strip of valve lock material.

Other objects and advantages will become more apparent in the teachings of the principles and advantages of the present invention in connection with the preferred embodiment thereof in the specification, claims and drawings, in which:

Figures 5, 6, 7:
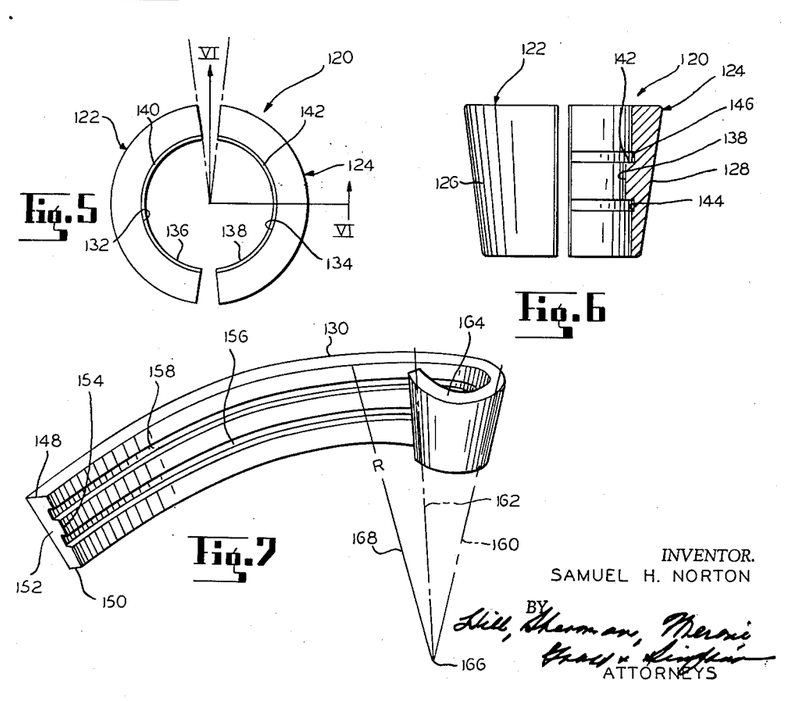
FIGURE 5 is a plan view of valve locks manufactured in accordance with the method of the invention assembled to form a valve spring retainer locking collar.
FIGURE 6 is a sectional view taken substantially along line VI—VI of FIGURE 5 and illustrating the valve locks in enlarged detail.
FIGURE 7 is a perspective view illustrating steps in the method of manufacture of the valve locks and showing the angle to which the material is edge-bent.

A valve lock of the improved structure which is obtainable with the machine and the practice of the method of the present invention may be observed in FIGURES 5 and 6 viewed in conjunction with FIGURE 7. The valve lock is shown assembled to form a composite collar 120 for holding a spring retainer plate, with the collar formed of two individual locks. As illustrated in the drawings, the valve collar 120 is formed of locks 122 and 124. Each of the locks has an outer arcuate surface 126 and 128, respectively, which lies completely within a conical plane. This plane may be of any chosen angle, but is preferably of the angle of the inner bored surface of a spring retainer plate, and the required angle must be accommodated by the shape of the stamp of material 130 from which the lock is formed.

The locks 122 and 124 have inner surfaces 132 and 134 which lie in a cylindrical plane of substantially the size of the diameter of the outer surface of the valve stem against which the assembled collar will fit. A feature of the method and machine of the invention is its ability to produce locks which have the outer surfaces 126 and 128 and the inner surfaces 132 and 134, which lie wholly within cylindrical and conical planes and which are not marred by defects or broken by surfaces not within the planes.

Extending inwardly from the inner concave cylindrical surfaces 132 and 134 of the lock are segmental annular beads 136 and 138. The beads project radially inwardly and have flat upper surfaces 140 and 142 which lie completely on a plane which extends at right angles to the axis of the locks. The upper surfaces 140 and 142 will, therefore, make surface contact with the upper surface of a groove in the valve stem to prevent axial displacement of the locks along the stem and thereby hold the valve spring retainer plate in place.

The bead 138 is shown formed with grooves 144 and 146 below and above the bead.

The strip of material 130 from which the beads are made is originally in a straight substantially flat state, as will be described later, and, as shown in FIGURE 7, has a thick outer edge 148 and a thinner inner edge 150. The underside 152 is flat and will subsequently form the outer surfaces of locks and the upper side has a centrally located ridge 154 which will form the beads of the locks and has channels 156 and 158 on either side of the bead which will form the grooves at either side of the bead in the finished locks.

Figure 1:
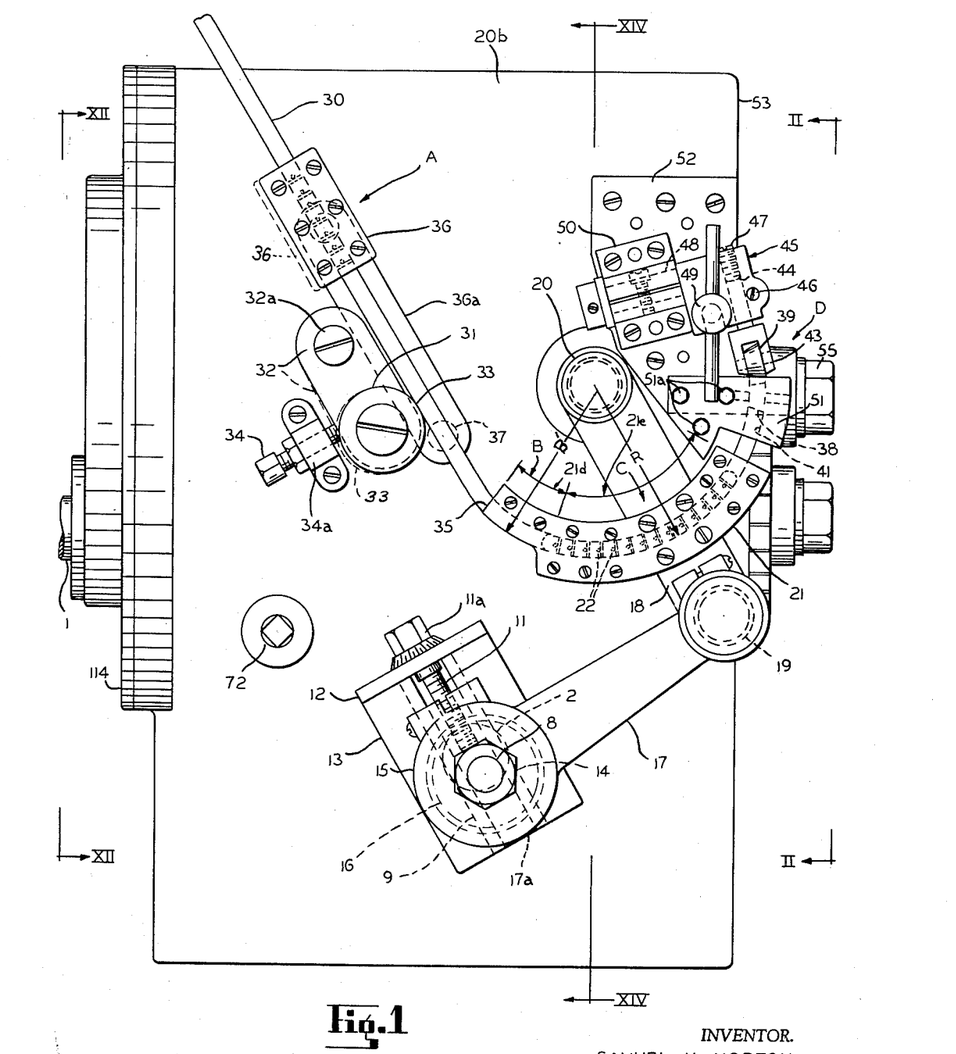
FIGURE 1 is a plan view of a machine for manufacturing valve spring retainer locks embodying the principles of the machine and method of the present invention.

In accordance with the method of the present invention, a flat strip of material such as shown at 130 in FIGURE 7, and shown at 30 in FIGURE 1, is first edge-bent in the plane of the material. The edge-bending forms a curve with a radius equal to the distance from the outer edge of the lock cone to the intersection of two lines which bisect the material on each side of the cone-shaped lock. This may be observed in FIGURE 7. Lines 160 and 162 bisect the material at each side of the cone shaped lock 164 which has been formed at the end of the material. The bisecting lines 160 and 162 meet at 166. Thus, the radius to which the material is edge-bent is determined by the length of the lines 160 and 162 from the point of intersection 166 to the upper edge 148 of the material. This radius of curvature is indicated by the line 168 with the curvature radius being shown as R. The material is edge-bent in the direction with the thinner edge 150 at the inside of the curvature and the thicker edge 148 at the outside of the curvature.

In edge-bending, in accordance with the present invention, it is preferred to include a step of over-bending. This is accomplished by first bending the flat strip at a bending station to a radius smaller than the desired radius to obtain a sharper curvature than required. The material is then passed forwardly toward a bending station where the material is bent out of the plane of its flat surface to form a lock. Between the location where the material is over-bent and the bending station, the material is released and will spring back to the desired radius.

In a subsequent step in the method of forming locks from the flat strip of material, the material which has been edge-bent in the plane of the material is guided transversely out of the plane to be curled to form locks. This transverse bending and curling is in a direction with the bead 154, as illustrated in FIGURE 7, at the inside of the curled lock 164. In one form of practicing the method, the material is curled laterally out of the plane of the flat material by guide rolls holding the material against a die surface to obtain the desired radius of curvature.

It has been recognized that it is impossible to bend the very end of a length of material, such as metal from which the locks preferably are made to an even curvature to the very end of the material. In accordance with the present invention, a first portion is bent or curled out of the plane of the material, and a first short length is cut from the end leaving a bent end on the material. The cut-off end is discarded and the bent end on the supply strip of material will form the lead end of a succeeding lock. After the first short length is discarded, the bent end will have the proper curvature for a succeeding lock and no more material will be discarded with the material being fully used and with the production of no scrap. The flat material is then formed into a series of locks by sequentially curling the end to form a lock and cutting off a lock leaving a bent end on the strip of material with each lock that is cut.

The locks are cut in substantially semi-cylindrical form with slightly less material or metal in them than will be required for the finished lock. Also, the material from which the locks are made is slightly thicker than the finished lock. After the individual locks are cut off, they are pressed by applying a pressure to their curved surfaces to reduce the thickness to the thickness of the finished lock, and to increase the dimensions of the curved surfaces to form the lock of the desired length. This pressing is done by stamping, coining or forming, and removes any imperfections in the surface of the lock, which may be present. After the final pressing operation, the lock is complete.

Figure 2:
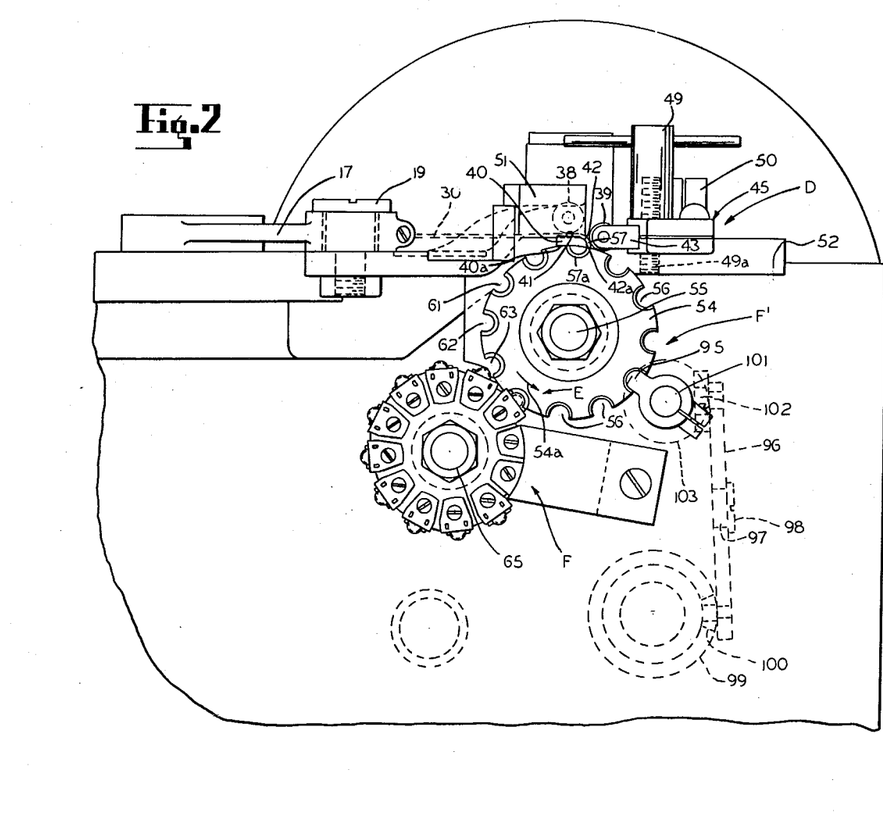
FIGURE 2 is a side elevational view of the machine of FIGURE 1 taken substantially along line II—II of FIGURE 1.
Figures 8, 8A, 8B, 8C, 8D:
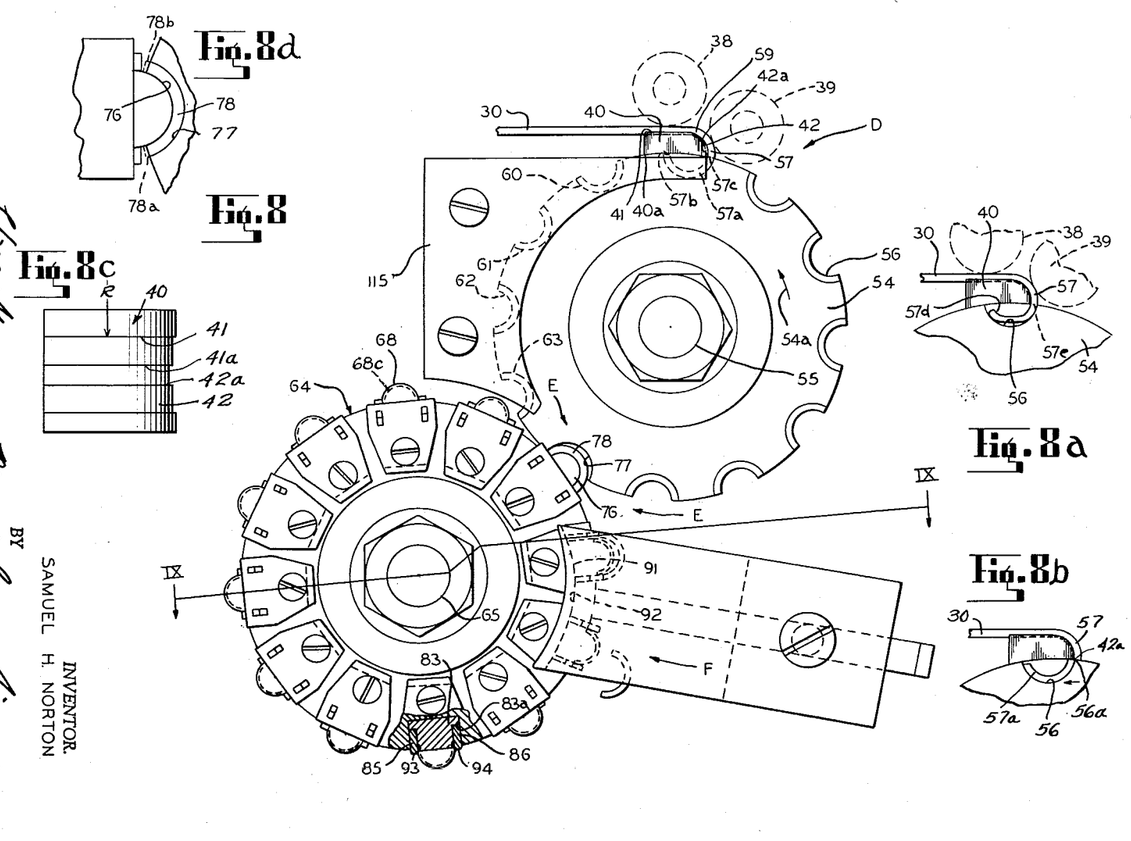
FIGURE 8 is a side elevational view similar to FIGURE 2, but in enlarged detail and with certain parts removed for clarity.
FIGURE 8a is a fragmental detailed view of a portion of FIGURE 8 illustrating a step in the method of manufacturing valve locks wherein the first end is formed and discarded.
FIGURE 8b is a fragmentary detailed view similar to FIGURE 8a and illustrating cutting a lock from a strip.
FIGURE 8c is a fragmental detailed plan view of a die for aiding in curling the lock material.
FIGURE 8d is a fragmental detailed view illustrating pressing a lock.

The machine illustrated in the drawings embodies the principles of the present invention and presents a form of practicing the method of the invention. Corresponding the machine to the aforedescribed method, as illustrated in FIGURE 1, the flat strip 30 of the material is fed into the machine and is generally held against moving or springing backwardly at a holding station A. The material is first bent at an over-bending station B. The edge-bent material continues through the machine and is allowed to spring back at a feeding station C with the material being retained in its edge-bent form at the proper radius. At bending station D the material is curled downwardly on a flat plane, and the details of this station are shown in FIGURES 2 and 8. At the bending station D, the individual locks are cut from the end of the bent strip of lock material, and are carried downwardly to a pressing station E. At this station they are surface-pressed to remove defects and bring them to their desired dimensions. After the pressing station, they are moved to an ejecting station F, where the finished lock is ejected from the machine. In some instances, the locks will not move down to station F, but, as illustrated in FIGURE 2 will move up to station F' where they are ejected from the machine. This will become more clear later in the description.

Referring now to the overall machine, a power input shaft 1, FIGURES 1, 12, 13 and 14, is connected to a suitable source of power, and provides operative power for the machine. Mounted on the power input shaft 1, is a gear 4 which drives a mating gear 3 mounted on a vertical shaft 2. The power input shaft also turns horizontal shaft 5 by means of gear 6, which is mounted on shaft 5, and which is driven by a gear 7 on the power input shaft 1.

At the upper end of shaft 2, and keyed thereto, is a crank housing 13, FIGURES 1 and 2. A crank pin 8 is integral with a block 9 which slides in a T slot 10 and the crank pin is adjustable, as will be illustrated in FIGURE 1. The crank pin 8 and block 9 are forced to move in a slot by a screw 11. The screw 11 is rotatably mounted in an end plate 12, and is threaded into the block 9. The crank pin is locked in position in the T slot 10, and to the crank housing 13 by a nut 14, which clamps a washer 15 against a bearing 16 to thereby anchor the crank pin 8 and the bearing 16 to the housing 13. The screw 11 carries a head 11a for adjusting the position of the crank pin 8. Therefore, the eccentricity of the crank pin with respect to the shaft 2 is adjustable to adjust the reciprocating stroke afforded a connecting rod 17. The crank pin 8 and the bearing 16 rotate together and the connecting rod 17 has an annular end 17a which fits over the oscillating bearing 16 to be driven thereby. The entire crank housing 13 thus rotates with the shaft 2, and the degree of eccentricity or oscillation for driving the connecting rod 17 is determined by the degree to which the crank pin 8 and its bearing 16 are offset from the center of the shaft 2.

The connecting rod 17 is pivotally attached to an arm 18 by a connecting pin rod 19. The arm 18 is pivotally oscillated on a stationary pin 20, projecting above a boss 20a projecting above and integral with the frame housing 20b.

A circular segmental ring sector or feeding and bending bar 21 is detachably mounted on the arm 20, and oscillates with it. Mounted in the sector 21 are a number of gripping fingers 22 which are illustrated in detail in FIGURES 3 and 4. The gripping fingers 22 function to move the strip of lock material in a forward direction, and thus the length of the oscillation arc of the arm 18 determines the amount of material that is fed forwardly with each stroke of the arm. This is, therefore, adjusted by the screw 11.

Figure 3:
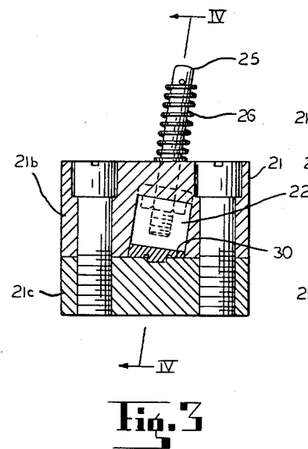
FIGURE 3 is a greatly enlarged detailed sectional view taken along line III—III of FIGURE 4, and illustrating the structure of the mechanism for advancing a strip of material for making the valve locks.
Figure 4:
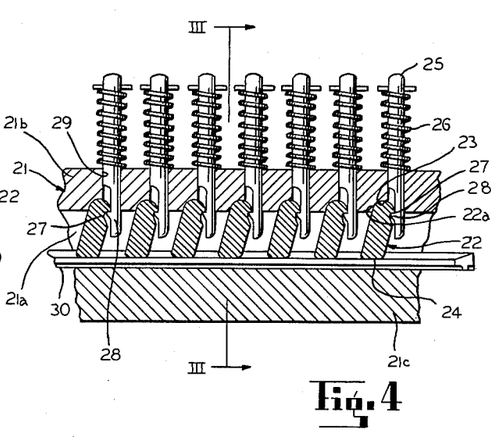
FIGURE 4 is also a greatly enlarged detailed sectional view taken along line IV—IV of FIGURE 3, and illustrating the mechanism for advancing the strip of material.

As illustrated in FIGURES 3 and 4, the gripping fingers 22 are seated at their upper ends 22a in a round socket 23. For this purpose, the upper ends of the fingers are rounded. The fingers are held into the sockets 23 by pins 25 which are provided with laterally extending tongues 28 to project to pockets 27 in the fingers 22. Each of the fingers is identical in construction and, therefore, the details of construction apply to each.

The pins 25 are slidably mounted in vertical bored openings 29 in the sector 21, and are being constantly forced upwardly by springs 26. This causes an upward pull of the tongues 28 against the upper edge of the pockets 27 in the fingers 22 to tend to rotate the fingers in their sockets 23. This also tends to hold the fingers 22 firmly in their sockets 23 and rotate the fingers in a direction to contact the material 30. The sector 21 is formed with a channel 21a or tunnel formed therein, and the sector may be formed with an upper part 21b and a lower part 21c, with the parts being clamped together. The tunnel 21a is closed on all sides over an arc 21e and is open on the outer side over an arc 21d.

The sector 21 is oscillated back and forth, causing the fingers 22 to bite into the metal such as at a surface area 24 when the sector is carried forwardly and to loosen and slip when the sector is carried back. This is due to the angle at which the fingers are tilted when they contact the metal strip 30, and to the rounded surface at their lower edge. The large number of pusher fingers 22 will distribute the pushing load over the surface of the metal strip 30 to such an extent that no one of the fingers will bite into the metal sufficiently to destructively mark it.

As the circular sector or feeding bar 21 is moved forwardly it will carry the metal strip with it. The station B, designated by the arcuate section line 21d of the feeding bar 21, is the bending station and is provided with a smaller diameter having a radius "B" than the section 21e, which is of larger diameter and has a radius "R." This radius R is the radius which is shown in FIGURE 7. The radius of the section 21d of the feeding bar 21 and the setting of the roll 33 determines the radius to which the material strip 30 is edge-bent.

As the metal 30 is wrapped around the circular feed bar 21 over the length indicated at 21d, which is also indicated as station B, it will be bent with a sharper curve than the feed bar has over the arc 21e which is indicated as station C. Since the metal strip 30 is quite springy, it will spring back to the radius R when it reaches the section 21e and will be at the desired radius and will slide freely around this part of the feeding bar.

To aid in edge-bending the strip 30, a roll 31 is mounted on an arm 32 which is pivotally supported at 32a. The arm 32 is adjusted in its pivotal position by an adjusting screw 34 threaded into a bracket 34a so as to forcibly position the roll into contact with the metal 30 at 33. The roll 31 causes the metal to wrap tightly around the section 21d of the feeding and bending circular bar 21. The tunnel 21a in the section 21e of the bar slides on the surfaces of the metal strip 30, and holds the metal from turning over and kinking.

A hold-back or check device 36 is located at station A, as shown in FIGURE 1. The check device 36 is carried in its entity on an arm 36a, which is swung on a pivotal support pin 37. The check device 36 utilizes fingers of the same construction illustrated in FIGURES 3 and 4, and is used for preventing backward movement of the strip when a fresh or new strip of metal is being started into the circular feeding arm 21. After the metal reaches the bending rolls 38 and 39 and is formed down and around into the cutting and carrying die wheel 40, it will not pull back because of the hook action over the convex die surface 42, as illustrated in FIGURES 2 and 8.

The metal may be of different spring characteristics and the roll 33 can be adjusted to accommodate different degrees of overbending to compensate for different spring back. The hold-back device 36 moves laterally with adjustment of the roll. For example, when the roll 31 is adjusted to the dotted line position of FIGURE 1, the holdback 36 moves to the dotted line position.

Figure 13:
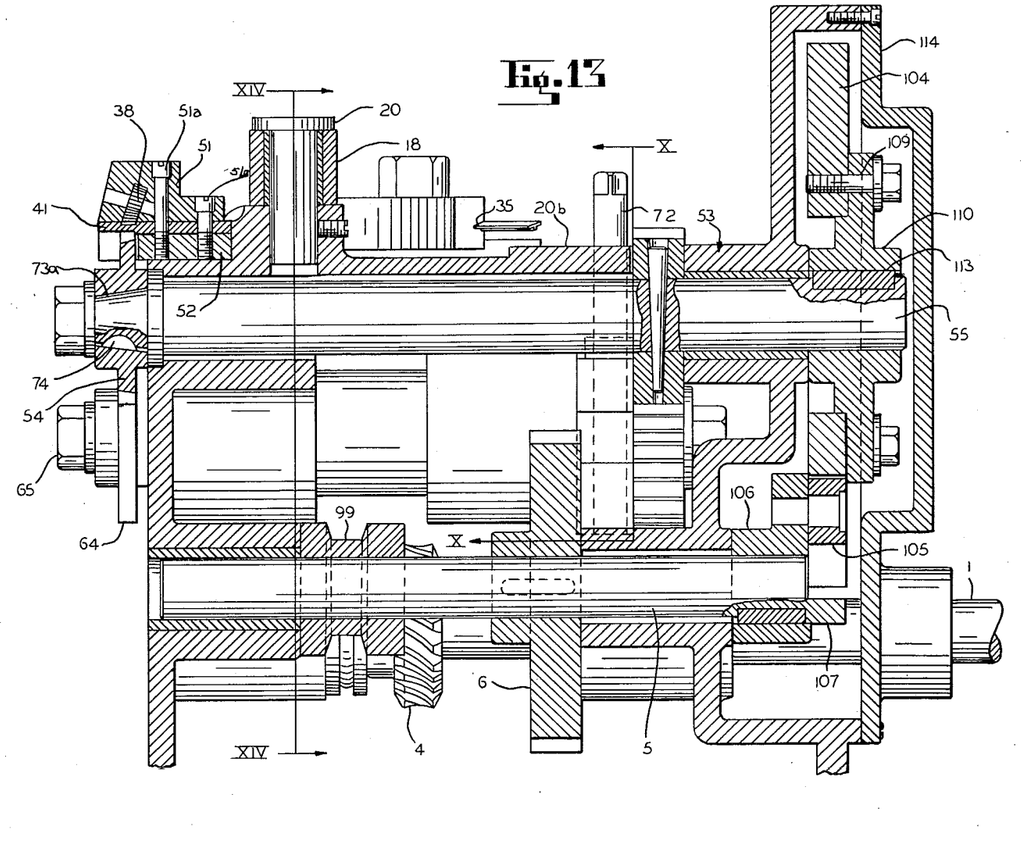
FIGURE 13 is a vertical sectional view taken along line XIII—XIII of FIGURE 12; and, FIGURE 14 is a vertical sectional view taken along line XIV—XIV of FIGURE 13.
Figure 14:
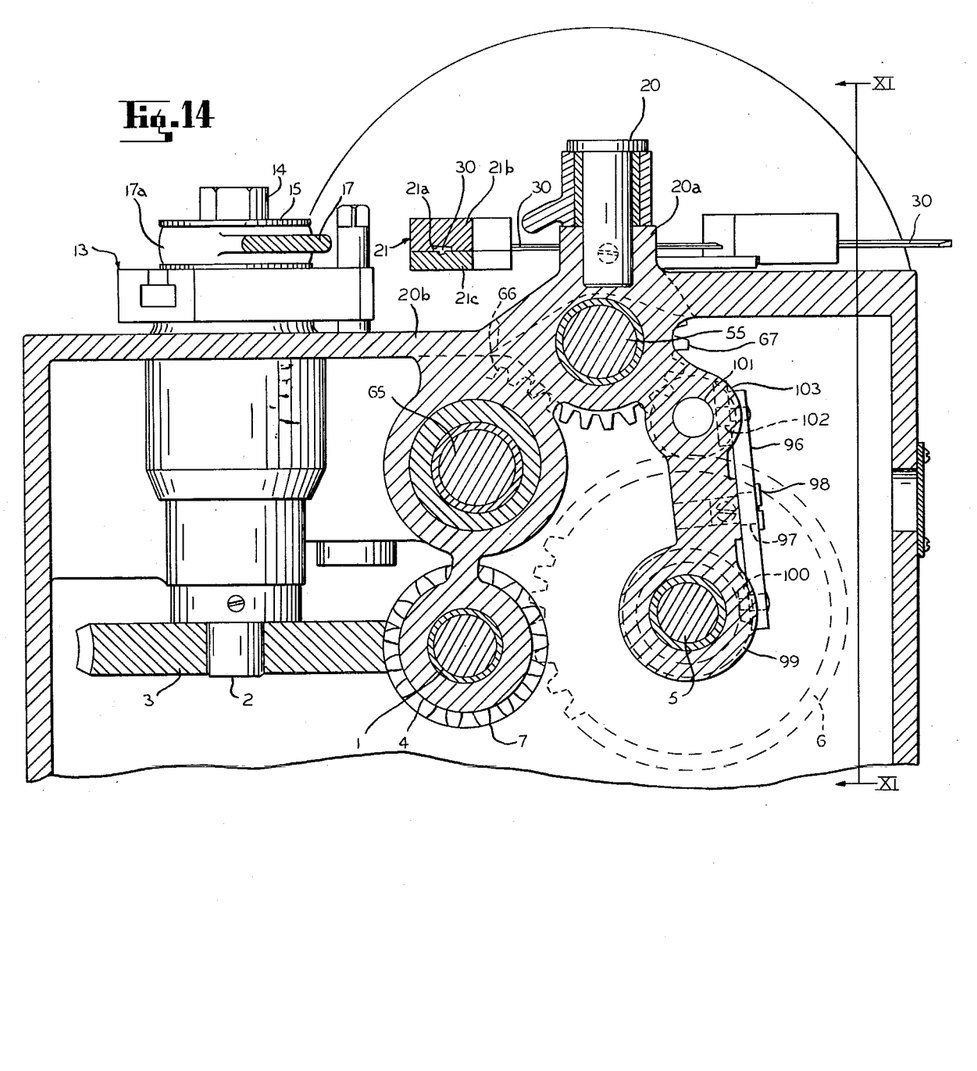

The curved feeding and bending bar 21 feeds the edge-bent strip of metal forwardly to the bending station shown at D in FIGURE 1. At the bending station is a guiding and curling die 40 with its upper surface being substantially in the plane in which the bent strip of metal 30 is fed forwardly. A curved groove 41, FIGURE 8c, is machined in the upper surface of this curling die having a radius equal to R in the bending arm 21. The groove 41 is provided with a channel 41a which accommodates the ridge 154 in the center of the strip of the material. The groove 41 assists in guiding the strip of metal under a backing roll 38, and against a deflector roll 39. The bending or curving of the metal to form the individual locks is accomplished by forcing the metal laterally or in other words, transversely, out of the plane of the strip and is accomplished by the backing roll 38 holding the metal down against the die 40 so that it cannot raise, assisted by the deflecting roll 39 which forces the metal downwardly against the forward curved nose 42 of the guide die 40. This action is illustrated in FIGURES 2 and 8. The curling die 40 is clamped in position by a block 51 which is mounted on a plate 52 on the frame, by bolts 51a, such as illustrated in FIGURES 1 and 13. The block 51 also carries the backing roll 38. The rolls 38 and 39 are frusto-conical in shape and are so shaped so as to bend the end of the strip downwardly with the outer surface of the lock formed from the strip, having a surface in a conical plane, and the inner surface being cylindrical. The strip is fed forwardly to the bending station with its lower surface in a substantially horizontal plane, and its upper surface which will form the outer surface of the lock, extending in a tilted plane.

The deflector roll 39 is supported in a yoke 43 which has a shaft 44 extending from it, FIGURES 1 and 2. The shaft 44 supports the yoke 43 and is clamped in a housing 45, which is split with the split ends drawn together by a screw 46. The shaft 44 which carries the deflector roll 39 is adjusted to move the roller 39 in a direction toward or away from the bending station by a threaded screw 47, threaded into the housing 45. The screw 46 is loosened for adjusting and is tightened to clamp the roll 39 in its adjusted position. I have found that the end of the lock material can be curled to a greater or a lesser degree by adjusting roll 39 inwardly or outwardly relative to the material.

In this manner, the yoke 43 and the roll 39 carried thereby can be rotated about the axis of the shaft 44 to bring the face of the roll 39 to the proper angle against the metal 30. Therefore the lock is formed into an arcuate shape by the action of the rolls 38 and 39 and the block 40.

After a complete strip 30 has been fed through the machine, in order to remove the last scrap end of metal which will be a short piece extending from the feed fingers 22 to the roll 39, means have been provided to remove the roll 39 from the path of metal. This is accomplished by swinging the entire housing 45 on a trunnion support 48 after removing a pin nut 49, which is threaded over a bolt 49a. The trunnion 48 is pivotally mounted in a block 50 which is secured on the top plate 20b of the frame. The block 50 for supporting the housing 45 for the deflecting roller and the block 51 for clamping the guide die 40 in place, are not directly mounted on the top 20b of the frame casting 53, but are securely bolted and held to the plate 52, which in turn is bolted or screwed onto the frame plate top 20b, as is shown in FIGURES 1 and 13.

When the metal strip 30 is curled downwardly transversely out of the path of the strip by the backing roll 38, deflector roll 39 and die 40, the curled end is received by a serrated circular die wheel 54 mounted on a shaft 55, as is illustrated in FIGURES 2, 8 and 13. The circular die wheel 54 has a plurality of concave conically shaped serrations or die pockets 56 circumferentially spaced around its outer edge. The die wheel 54 is driven to be indexed forwardly and with each indexing movement to position a die pocket 56 at the bending station to receive a bent lock.

The conically shaped die pockets 56 will be placed with one end directly under the curved end 57 of the metal strip 30 so that the strip as it curls will enter the die pocket 56. The leading end 57b will come up under the lower surface 40a of the guide die 40, and the lock will be severed from the end of the material by being cut at 57c. For purposes of cutting the lock from the end of the material, the die surface 42 of the die block 40 terminates in a cutting end 42a, FIGURES 8b and 8c. This cutting end 42a coacts with the sharp edge 56a of the die pocket 56 adjacent the outer peripheral edge of the die wheel 54 to sever the lock, in the manner shown in FIGURE 8b, as the wheel is indexed forwardly in the direction shown by the arrow 54a in FIG- URES 2 and 8. The circular die wheel 54 will continually index forwardly until the cut-off lock 57a is carried forward to the next station, and another die pocket 56 is in position in the bending station.

During the turning movement of the circular die wheel 54, the feeding and bending plate 21 has been moving backward with the feed fingers 22 sliding on the metal strip 30. At the completion of the forward indexing of the die wheel 54, the wheel will be stopped, and the bending and feeding plate 21 will be moved forwardly to force a new length of strip material over the die block 40 and into the die pocket 56. The feed fingers 22 will grip onto the metal 30, and force the metal strip forwardly over the die surface 42 and under the rolls 38 and 39 to curl the material.

In starting a fresh strip of material, the material will be fed forwardly and guided downwardly by the rolls 38 and 39. The bent lead end 57d, as shown in FIGURE 8a, will move into the die pocket 56, but has not been curled to the correct curvature of the lock. This is due to the fact that it is substantially impossible to form an arc of even curvature at the end of a supply length of metal. Thus, the metal is moved forwardly and curled downwardly until the portion at 57 against the die surface 42 attains the correct curvature for the lock. The lead end 57d is then cut off at 57e, and the end 57d is scrapped. The bent end 57 will be left on the supply strip 30 to form the leading end of the next formed lock and thus, the next lock will have a complete curvature of the proper radius, and no waste material is formed except for the very lead end of the strip.

With each lock that is cut off, a bent end 57 is left on the supply strip to form the leading end of the next lock. This method permits elimination of scrap and yet a full lock can be formed with each operation, with the lock using the supply material to the very end.

The material 30 is supplied of a thickness which is greater than that for the finished lock. Also, the lock that is cut off, such as shown at 78 in FIGURE 8d, is shorter than the completed lock. To finish the lock, it is pressed in a pressing operation to correct defects in shape and in the surface, to expand it to the proper length and to reduce it to the proper thickness. This removes surface defects and insures a smooth finished lock. To accomplish this, lobes 76 press the locks, such as 78 in FIGURE 8d, into die pockets 77, and decrease the thickness of the locks and increase their length, as shown by the dotted expansion of length of the ends 78a and 78b.

Figure 12:
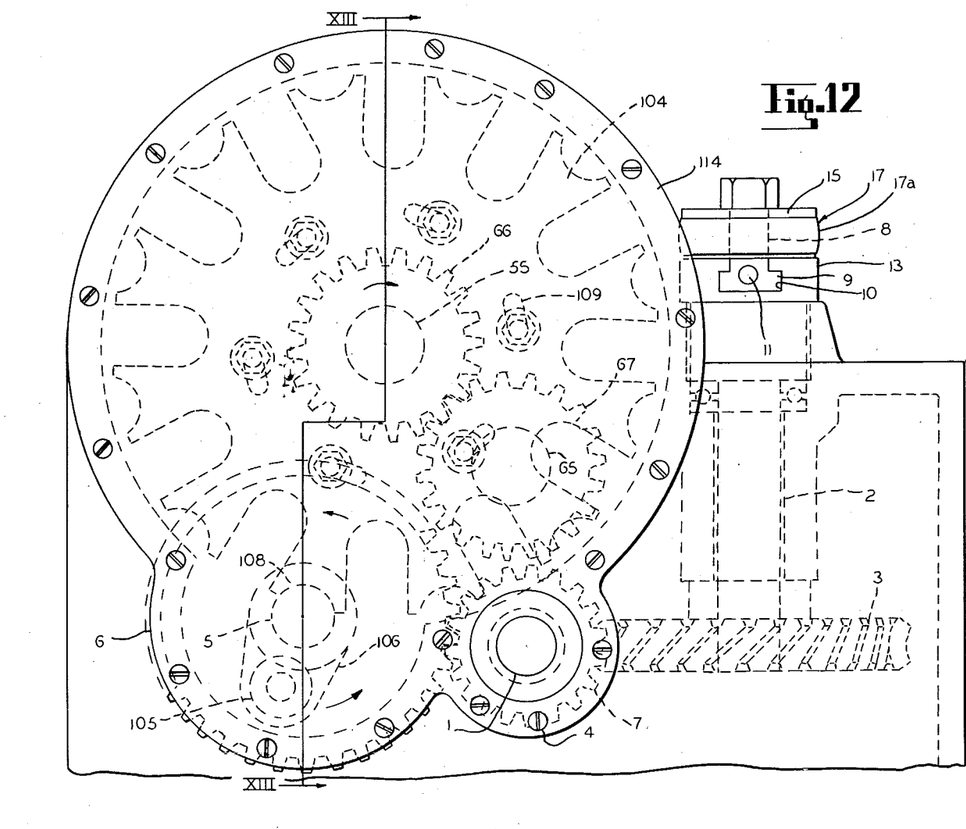
FIGURE 12 is a side elevational view illustrating the positions of a number of the parts in hidden lines and taken substantially along line XII—XII of FIGURE 1.

Pressing is accomplished at station E, as is shown in FIGURES 2, 8 and 8d. In geared relation to the die wheel 54, is a lobe studded wheel 64. The wheel 64 is mounted for indexing rotation on a shaft 65. The die wheel 54 and the lobe wheel 64 are geared to index in synchronism by gears 66 and 67, as shown in FIGURE 12.

Figure 10:
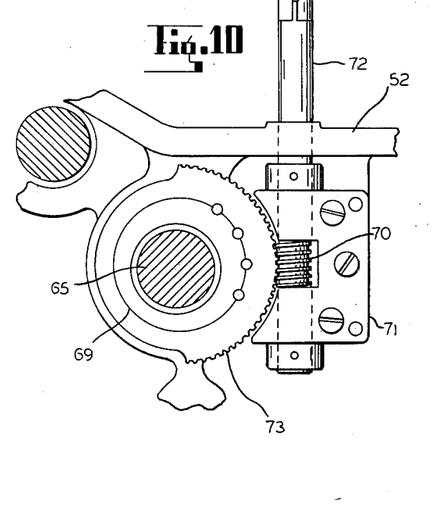
FIGURE 10 is a sectional view taken along line X—X of FIGURE 13, and illustrating the mechanism for adjusting the spacing between the stamping or pressing dies.

The lobes 68 on the wheel 64 intermesh with the die pockets 56 on the wheel 54 in pressing relation to the locks in the die pockets. The thickness to which the locks are pressed is controlled by adjustably controlling the distance between the axial center of the wheels 64 and 54. This is varied by turning an eccentric bushing 69, FIGURE 10, which adjusts the position of the shaft 65. The eccentric bushing 69 carries a segmental worm wheel 73, which is driven by a worm 70 mounted on an adjusting shaft 72. The adjusting shaft projects through the main casting 52, and is accessible for easy adjustment of same.

Figure 9:
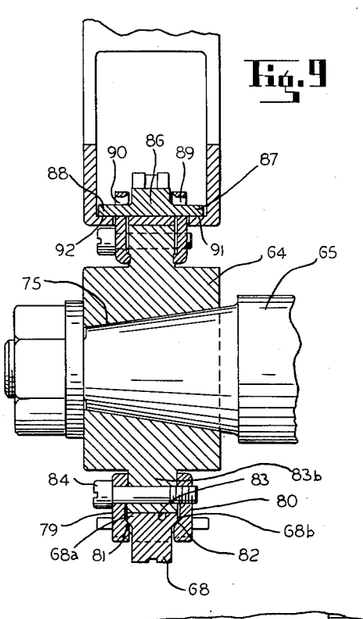
FIGURE 9 is a detailed sectional view taken along line IX—IX of FIGURE 8.

As illustrated in FIGURE 13, the wheel 54 is mounted on a shaft 55 by a taper 73a and a key 74. The wheel 64 is similarly mounted on its shaft 65 by a taper 75, as shown in FIGURE 9, but carries no key. The pressing or final forming operation is, therefore, performed on the half-looped shaped lock, as it is carried between one of the lobes 76, carried on the lobe wheel and one of the die pockets 56. This is illustrated in FIGURE 8 and 8d with the lobe 76 pressing the lock 78 into the die pocket 77.

The die pockets 56, of course, have conical surfaces that impart the final conical shape to the finished conical outer surface of the half circular lock 78, and each of the lobes 68 have cylindrical surfaces which impart an inner cylindrical surface to the inner wall of the lock 78. The locks will normally have the bead shown in the finished locks in FIGURES 5 and 6, but this bead has been omitted from the locks for clarity in FIGURES 2 and 8. The pressing lobes 68 will have grooves 68c to accommodate the beads. The pressing lobes 68, FIGURE 9, are clamped to the wheel 64, by plates 79 and 80 which have tapered edges 81 and 82 to forcibly retain the lobes 68 against their seat 83. The lobes are positioned in recesses 83a in the wheel 64, circumferentially spaced around the wheel 64, as shown in FIGURES 8 and 9. The plates are held against the upper and lower surfaces of the flat annular extension 83b of the wheel by a bolt 84 passing through an opening in the upper plate 79, and through the wheel, and threaded into the lower plate 80. The tapered edges 81 and 82 of the plates engage coacting tapered surfaces of enlarged ridge portions 68a and 68b on the upper and lower surfaces of the lobes 68.

When the lobe presses a lock into a die pocket 56, the lock will normally cling to the lobe 68. To eject the locks from the lobes, ejection plates 85 and 86 are positioned on each side of the lobe. These ejection plates are normally recessed into the openings 83a in the wheel 64, but are moved forcibly outwardly to engage the ends of the locks to kick them off the lobes.

To move the ejection plates and control their position, plate 86 has extensions 87 and 88 at each side which project through holes 89 and 90 of the plates 79 and 80. Cam surfaces 91 and 92 are located to engage the projections 87 and 88 as the wheel 64 is rotated past the cam surfaces. This will force the plate 86 outwardly. Plate 85 is provided with similar extensions which protrude through holes in the plates 79 and 80. This plate 85 is simultaneously forced outwardly so that each end of the completed lock will be engaged to be forced off the lobe. As illustrated in FIGURE 8, the outer surfaces 93 and 94 are the surfaces which engage the locks to kick them off the lobes.

In some instances, a valve lock may fail to stick on the lobes 68, and instead will stick in the die pocket 56. To prevent such a lock from being carried up into the bending station, an auxiliary ejector is provided to eject locks from the die wheel 54.

Figure 11:
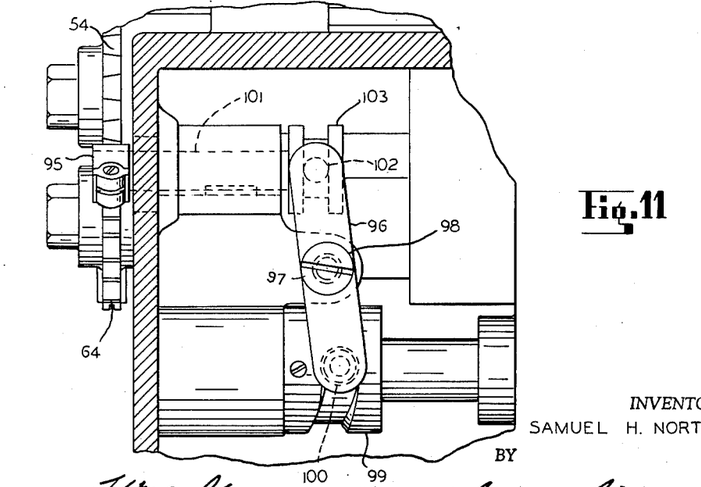
FIGURE 11 is a vertical sectional view taken along line XI—XI of FIGURE 14 and illustrating the mechanism for operating an ejector for the finished locks.

As shown in FIGURES 2 and 11, a pusher finger 95 will slide across the die opening from the small end to the large end each time the die wheel is indexed, to force a lock out of the die opening, if a lock is present. The finger 95 is actuated by a lever 96 pivoted at 97 on a screw 98. The lever is intermittently oscillated by a barrel cam 99 working against a follower roller 100 mounted at the end of the lever 96. The pusher finger 95 is clamped to a reciprocating horizontally extending shaft 101. At the inner end of the shaft 101 is a grooved head 103. A pin 102 is slidably mounted in this groove and functions to push the shaft 101 up and down each time the die wheel 54 is in the stationary part of its cycle.

The intermittent rotation of the die wheel 54 is produced by Geneva motion, consisting of a slotted wheel 104 rotated intermittently by a roller 105 mounted on an arm 106 which is in turn driven by its shaft 5, as is shown in detail in FIGURES 12 and 13. The Geneva wheel 104 is locked against accidental turning by a circular extension 107 of the shaft 5, which rotates into a circular direction 108 in the Geneva wheel. When the die wheel 54 is first installed, difficulty may be experienced in getting it to stop at exactly the right spot in relation to the other parts of the machine. To facilitate the initial setting, slotted holes 109 are located in the Geneva wheel hub 110. The Geneva wheel 104 is mounted on the hub 110, and can be turned on the hub an amount equal to the pitch of one gear tooth when the bolts 111, which connect the Geneva wheel 104 to its hub 110, are loosened. The hub 110 is keyed to the shaft 55 by a key 113. A guard 114, as illustrated, is attached to the frame 53 to enclose the Geneva drive, shown in FIGURES 1, 12 and 13.

As illustrated in FIGURE 8, a guard 115 is mounted to extend over the die openings in the die wheel 54 to prevent the individual formed locks from falling out of the die openings as they are being carried down to the pressing station E.

In operation, a flat tapered strip of material 30, FIGURE 1, is fed into the machine past a holding station A, which has a hold-back device 36 to hold the strip each time it is advanced. The strip is fed past a pressure roll 33, and fed into an over-bending station B. At this point, the strip 30 passes into an opening in the bending end of the bar 21. Over the arc 21d of the bar, the strip is edge-bent to a radius B, which is sharper than the desired radius. The strip is then fed into a feeding station C which retains the strip 30 in an arcuate form but releases the over-bent strip to spring back to a radius R, which is the desired bent radius. This strip is held in this edge-bent form for the arc 21e. At the feeding station C, feeding fingers 21, as shown in detail in FIGURES 3 and 4, grip the arcuate edge-bent strip to move it forwardly each time the bending and feeding bar 21 is indexed in a forward direction toward the bending station D. At the bending station, the leading end of the strip is deflected downwardly by a conically shaped deflector roller 39 and backed by a backing roller 38. These rollers hold the strip against a guide die 41 to bend the end downwardly out of the plane of the strip 30 and force it against the surface 42 of the die 40. The curled end will enter one of the conically shaped concave die openings 56 on the die wheel 54. The first end of the strip 57a, as shown in FIG. 8a, does not curl satisfactorily, and is severed at 57e, and discarded as scrap. A curled or bent end 57 is left on the strip, and each succeeding lock is thus formed by indexing the strip 30 forwardly to force a lock to curl the material further and slide a curled lock into one of the die openings 56. The locks are cut by the die wheel 54 indexing forwardly to cause the cutting tip 42a to sever the material. The individual locks are carried downwardly into a pressing station E, where a lobe 68 presses the lock which has a greater thickness than desired, and a shorter length than desired, into the proper size. The completed locks are then carried forwardly on the lobes 68 mounted on the wheel 64, where they are ejected at station F, by ejectors 85 and 86 being moved outwardly by action of the cam surfaces 91 and 92, FIGURES 8 and 9. In the event the locks stay in the die openings, a pusher finger 95 moves laterally through each of the die openings in the die wheel 54, as it is indexed forwardly.

Thus, it will be seen that I have provided an improved method and machine for making valve spring retainer locks, which meets the objectives and advantages hereinbefore set forth. As above referred to, and as will be apparent from the description of the method and machine, locks of improved structure are formed which were heretofore unavailable with methods and machines known to the art.

The method and machine accomplish an improved lock structure and a saving of material. The features of the invention are well adapted to embodiment in a high speed production machine for rapidly and inexpensively producing locks in large quantities.

I have, in the drawings and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. In a machine for forming valve locks from a flat strip of material by forcing the material in an endwise direction and guiding the end on a curved forming surface laterally disposed of the strip, apparatus for forcing the flat strip of material forwardly including means for supporting one surface of the material, means for gripping an opposite surface of the material in a plurality of spaced locations along the strip with a relatively light gripping pressure to prevent excessive deforming pressure on the strip including a series of gripping fingers having gripping ends projecting toward the strip and inclined forwardly toward the strip to wedge thereagainst when the fingers are moved forwardly and having rounded portions at the other ends, pockets in the fingers adjacent the rounded ends, a mount for the fingers having sockets receiving the rounded ends, pins extending adjacent the pockets and provided with tongues projecting into the pockets in the fingers holding them in the sockets, resilient means drawing the pins in a direction to tend to pivot the fingers into gripping engagement with the surface of the strip of material, and feeding means for intermittently carrying the fingers and said supporting means forwardly in intermittent steps to carry the strip of material forwardly.

2. A machine for forming valve spring retainer locks comprising a bending station having a curved bending die extending from the plane of a flat strip of lock material out of the plane of the material to bend the end of the material as it is forced into the die, a curved bending and feeding bar positioned in advance of the bending station for feeding the strip of material forwardly and for edge-bending the flat strip of material, grippers carried on the feeding bar to engage the flat surface of the strip and advance it toward the bending station, means for oscillating the feeding bar and grippers about a pivotal point at the center of the arc of curvature around which the flat strip of material is edge-bent with the grippers advancing the strip in the forward oscillation and releasing the strip in the reverse gripping oscillation, and means to guide the strip against the feed bar whereby the strip will be edge-bent, said feeding bar having a first portion with a sharper radius than required to over-bend the material and having a second portion spaced from the first portion in the direction of movement of the strip having the desired radius for retaining the strip as it springs back and feeding it to the bending station.

3. A machine for manufacturing a series of arcuate valve spring retainer locks comprising a feeder for advancing a strip of substantially flat lock material to a bending station, a bending die at said station for curling the end of the strip, a die wheel having a plurality of outwardly facing concave curved conically shaped die openings in the outer edge spaced from each other and positioned to be advanced with rotation of the wheel to the bending station, and to receive the curled end of the material, guide means at the bending station for guiding the leading end of the strip of material on the bending die and into the die openings, means for cutting the lock lengths from the end of the strip of material after the lengths have been curled and nested in the die openings, a finished lobe having a cylindrical outer surface and adapted to be forced into the die openings to compress the locks in the die openings and press them to the desired dimensions and finish the surfaces thereof, means for advancing the die wheel, means for forcing the lobes into the die openings after the locks have been cut from the end of the material and are in the openings, first ejector means positioned to force the locks from the lobes, and second ejector means positioned to force the locks from the die openings after being compressed by the lobes in the event the locks are retained in the die openings after being compressed.

4. A machine for manufacturing a series of individual valve spring retainer locks from a strip of flat tapered material comprising means for advancing the strip of material in a flatwise direction to a bending station, a die surface for curling the material transversely at the bending station, a die wheel having a series of circumferentially disposed outwardly facing concave curved die pockets in the outer edge thereof positioned to be sequentially advanced to the bending station with rotation of the die wheel and to receive the curled end from the die surface, means for incrementally advancing the die wheel in stepwise fashion to bring the pockets into the bending station, means for guiding the leading end of the strip of material over the die surface and into the die pockets, means for cutting the individual curled locks from the end of the strip of material, a lobe wheel carrying a plurality of circumferentially disposed lock-pressing lobes and positioned to individually force the lobes into the die pockets to press the locks located therein to a desired thickness, means for advancing the lobe wheel in stepwise fashion about an axis parallel to the axis of the die wheel and in timed relation thereto so that the lobes will enter the die pockets with advancement of the die wheel, individual ejectors positioned at each side of each of the lobes and slidably carried on the lobe wheel for movement in a radial direction, and stationary cam means positioned to engage the indivdual ejectors and force them outwardly with respect to the lobe wheel to eject locks which are retained on the lobes after being pressed within the die pockets.

5. A machine for automatically forming valve spring retainer locks from a supply strip of tapered flat material which comprises a feeder positioned to grip the strip of material and move it forwardly in lengths substantially equal to the circumferential length of the finished locks, an edge-bender positioned to bend the strip of material in the flat plane of the strip with a thin edge of the strip being at the inner side of the arc of the bent material, a bending die positioned on the bending station for receiving the end of the strip and extending from the plane of the strip laterally out of the plane of the fed strip, a cutter positioned to sever the bent locks from the end of the strip in the die, and means positioned to receive the cut locks and apply a stamping pressure to the opposite surfaces thereof to press surface defects from the locks and press the locks to the exact finished dimensions.

6. A machine for forming valve spring retainer locks free from surface defects from tapered flat strip material which comprises a holdback station, an edge-bending station, a curling station, a cutting station, a pressing station, means at the holdback station accommodating movement of a strip of lock forming material only in a direction toward the edge-bending station, means at the edge-bending station for bending said strip against the edge of the strip in an arc in the plane of the strip, means at the curling station to deflect the leading end of the bent strip transversely of the plane of the strip to form a curled end on the strip, means at the cutting station to cut off the curled leading end from the strip, and means at the pressing station to act on the cut-off curled piece for die shaping the piece to finished shape.

7. A machine for forming valve spring retainer locks free from surface defects from flat tapered material which comprises an edge-bending station, a curling station, a cutting station, a pressing station, means at the edge-bending station for bending said strip edgewise in an arc lying in the plane of the strip, means at the curling station to deflect the leading end of the bent strip transversely of the plane of the strip to form a curled end on the strip, means at the cutting station to cut off the curled leading end from the strip, and means at the pressing station to act on the cut-off curled piece for die shaping the piece to finished shape.

8. A machine for manufacturing arcuate valve spring retainer locks from a flat strip of tapered material comprising an arcuate bending bar over which a strip of lock material is bent in an edgewise direction forming an arc lying in the plane of the flat material, a feeder for advancing the strip of material past said bending bar, means located after the bending bar for restraining the position of the bent material, an adjustable bending member in advance of the bending bar, means for laterally positioning the adjustable bending member relative to the bending bar to determine the arc at which the material is bent to compensate for differences in springiness of the material, a holdback device positioned in advance of the bending member and preventing movement of the strip of material in a backward direction, and means for supporting the holdback device for lateral movement with lateral adjustment of the bending member.

9. A mechanism for forming curled valve spring retainer locks from a flat tapered material having a rib on its undersurface comprising feeding means for moving a strip of material longitudinally forward to a bending station wherein the advance end of the strip is curled to form locks, a die member at the bending station having a straight lead-in portion in the plane of the material and a convex arcuate bending portion transversely curved transversely out of the plane of the strip of the material and with its surface facing transversely toward the material with said straight and said arcuate portions having a bending surface with a curved supporting area with a groove in a portion of the area of the bending surface accommodating the rib of the strip and holding the strip in a lateral direction, a first outer guide member positioned substantially in the path of the material as it is fed forwardly having a convex surface engaging the material in line contact across the material and guiding the material downwardly over the bending portion of the die member out of the plane of the material holding the rib in said groove, another guide surface positioned laterally opposite said lead-in portion in a location in advance of the first guide member engaging the material in line contact across the material and holding the strip of material against being forced transversely out of the plane of the material in a direction opposite of the bending portion whereby the lead end of the material is held on said bending portion and the rib is held in the groove as the material is fed forwardly, and means for cutting locks from the end of the material as the locks are formed leaving a bent end on the strip.

10. A mechanism for forming valve spring retainer locks comprising first means for bending a tapered flat surfaced strip of valve lock material against its thinnest edge into arcuate shape in the plane of the strip, second means for curling the leading end of said bent strip at right angles to the plane of the strip while holding the peripheral outer surface of said leading end in a conical shape, and third means for cutting said curled end from the strip.

11. A mechanism for forming valve spring retainer locks comprising first means for edge-bending a strip of valve lock material into arcuate shape in the plane of the strip, second means for curling the leading end of said end strip at right angles to the plane of the strip while holding the peripheral outer surface of said leading end in a conical shape, third means for cutting said curled end from the strip, and pressing means pressing the curled end into finished lock shape.

12. A mechanism for manufacturing valve spring retainer locks from a supply length of tapered flat surfaced lock material which comprises advancing and bending means moving the material longitudinally and bending it against its thinnest edge in the plane of the strip, curling means forcing the leading end of the edge-bent material into a curved arcuate path of the radius of a valve lock at substantially right angles to the plane of the strip including means for guiding and supporting the inner surface of the material and means for holding the peripheral outer surface of the leading end in a conical shape, holding means for holding the length of the material by applying a pressure along a line across the material at the outer surface thereof at a location ahead of the location of said guiding means, and means for preventing lateral displacement of the strip as the strip is curved into the arcuate path to form a lock.

13. A mechanism for forming valve spring retainer locks from flat surfaced tapered valve lock material which comprises an edge-bending station, a curling station, a cutting station, means at the edge-bending station for bending the strip of material toward the thinnest edge in an arc lying in the plane of the material, means at the curling station to deflect the leading end of the bent strip transversely of the plane of the strip to form a curled end and holding the peripheral outer surface of the leading end in a conical shape, and cutting means at the cutting station to cut off the curled leading end from the strip.

References Cited in the file of this patent

UNITED STATES PATENTS

| | | |
|---|---|---|
| 642,339 | Krummel | Jan. 30, 1900 |
| 802,712 | Scott et al. | Oct. 24, 1905 |
| 1,675,299 | Dawson | June 26, 1928 |
| 1,762,556 | Marshall | June 10, 1930 |
| 1,807,847 | Kellogg | June 2, 1931 |
| 1,822,600 | Olson | Sept. 8, 1931 |
| 1,823,009 | Toaz | Sept. 15, 1931 |
| 1,850,029 | Myers | Mar. 15, 1932 |
| 1,973,227 | Schoenrock | Sept. 11, 1934 |
| 1,991,642 | Turnquist | Feb. 19, 1935 |
| 2,037,838 | Van Uum | Apr. 21, 1936 |
| 2,063,798 | Firth | Dec. 8, 1936 |
| 2,092,255 | Keller | Sept. 7, 1937 |
| 2,107,585 | Reid | Feb. 8, 1938 |
| 2,353,925 | Pattison | July 18, 1944 |
| 2,595,060 | Dixon | Apr. 29, 1952 |
| 2,754,117 | Ghormley | July 19, 1956 |
| 2,942,643 | Pucci et al. | June 28, 1960 |